United States Patent [19]

Weinberg

[11] Patent Number: 5,741,385

[45] Date of Patent: Apr. 21, 1998

[54] METHOD OF STORING ACTIVE FILMS

[75] Inventor: Alan S. Weinberg, Taylors, S.C.

[73] Assignee: W.R. Grace & Co.-Conn., Duncan, S.C.

[21] Appl. No.: 248,901

[22] Filed: May 25, 1994

[51] Int. Cl.⁶ .................................................. B31C 81/00
[52] U.S. Cl. ...................... 156/192; 156/60; 156/323; 252/186.25; 252/188.28
[58] Field of Search ...................... 156/60, 182, 192, 156/323; 242/71.2, 71.3, 71.4, 71.1, 71.7, 55, 348, 348.2, 580, 564, 598, 590; 252/186.25, 186.33, 188.28, 383; 428/35.9, 35.8

[56] References Cited

U.S. PATENT DOCUMENTS

| | | | |
|---|---|---|---|
| 3,574,029 | 4/1971 | Ettre | 156/231 |
| 3,614,012 | 10/1971 | Edelman | 242/71.2 |
| 4,432,625 | 2/1984 | Harvey | 354/275 |
| 5,021,515 | 6/1991 | Cochran et al. | 525/371 |
| 5,049,624 | 9/1991 | Adams et al. | 525/371 |
| 5,203,941 | 4/1993 | Spain et al. | 156/209 |
| 5,211,875 | 5/1993 | Speer et al. | 252/188 |

FOREIGN PATENT DOCUMENTS

| | | |
|---|---|---|
| 0038760 | 10/1981 | European Pat. Off. . |
| 0507207 A2 | 10/1992 | European Pat. Off. . |

*Primary Examiner*—Merrick Dixon
*Attorney, Agent, or Firm*—Mark B. Quatt

[57] ABSTRACT

A method of storing a film having an active film material includes providing a carrier film and at least one strip of the active film material, positioning the at least one strip with respect to the carrier film; and rolling the at least one strip and carrier film together such that the at least one strip is isolated at least along its two major surfaces from the environment while the carrier film and the film with the active film material are in a rolled condition. The present invention also includes a roll of film comprising a carrier film, and at least one strip of active film material isolated from the environment.

5 Claims, 2 Drawing Sheets

METHOD OF STORING ACTIVE FILMS

FIELD OF THE INVENTION

The present invention relates to a film for use in environments containing oxygen-sensitive products, particularly food and beverage products, and a method for storing such a film so as not to lose its functionality or activity.

BACKGROUND OF THE INVENTION

It is well known that regulating the exposure of oxygen-sensitive products to oxygen maintains and enhances the quality and "shelf-life" of the product. In the packaging industry, several means for regulating oxygen exposure have already been developed. These means include modified atmosphere packaging (MAP) and oxygen barrier film packaging.

Another method currently being used is "active packaging" wherein a package for a food product is modified in some manner to regulate the food product's exposure to oxygen. One form of such active packaging includes the use of oxygen scavengers within a cavity of the package. The term "oxygen scavenger" as used herein refers to compositions, articles or the like which consume, deplete or reduce the amount of oxygen from a given environment. Typically, such oxygen scavengers are in the form of sachets which contain a composition which scavenges the oxygen through oxidation reactions. One such sachet contains iron-based compositions which oxidize to their ferric states. Another type of sachet contains unsaturated fatty acid salts on a particulate adsorbent. Yet another sachet contains metal/polyamide complex.

One disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate.

Another approach for regulating the exposure to oxygen involves incorporating an oxygen scavenger into the packaging structure itself. Through the incorporation of the scavenging material in the package itself, a more uniform scavenging effect through the package is achieved. This approach may be especially important where there is restricted air flow inside the package. Such incorporation can also provide a mechanism for intercepting and scavenging oxygen as it is passing through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts. However, incorporation of these powders and/or salts causes degradation of the wall's transparency and mechanical properties such as tear strength. In addition, these compounds can lead to processing difficulties, especially in the fabrication of thin layers such as thin films. Even further, the scavenging rates for walls containing these compounds appear to be unsuitable for many commercial oxygen-scavenging applications, e.g. such as those in which sachets are employed.

The oxygen scavenging systems disclosed in European applications 301,719 and 380,319 illustrate another attempt to produce an oxygen-scavenging wall. These patent applications disclose incorporating a metal catalyst-polyamide oxygen-scavenging system into the package wall. However, this system does not exhibit oxygen scavenging at a commercially feasible rate.

U.S. Pat. No. 3,935,141 to Potts et al. and U.S. Pat. No. 4,983,651 to Griffen disclose polymeric compositions which are environmentally degradable materials, i.e., materials designed to undergo total loss of elongation and tensile strength, after the useful lifetime of the package, upon weathering.

Oxygen scavengers suitable for commercial use in films of the present invention are disclosed in copending U.S. Ser. No. 679,419, filed Apr. 2, 1991, now abandoned, and a method of initiating oxygen scavenging generally is disclosed in U.S. Ser. No. 722,067, filed Jun. 27, 1991 now U.S. Pat. No. 5,211,875. Both applications are incorporated herein by reference as if set forth in full.

When incorporating an additive such as a gas scavenger or oxygen indicator within a packaging film, one concern is handling and shipping of the film prior to actual packaging on product without exhausting the activity or functionality of the additive.

SUMMARY OF THE INVENTION

The inventor has found that by properly positioning a strip of an active film material, possessing a desired activity, with respect to a carrier film and then winding the carrier film and the strip of active film material into a film roll, the film roll itself will serve to isolate the strip of active film material from the atmosphere until the film roll is unwound. This is especially so when the carrier film contains an oxygen barrier layer or a layer of a material which serves to isolate the activity of the film material. This can be accomplished by interleafing the strip of active film material with the carrier film, or by incorporating the active film material in a coextruded or laminated carrier film or laminate.

Accordingly, it is a principal object of the present invention to provide a method for preserving the functionality of an active film prior to actual use in a packaging environment.

Still other objects and advantages of the present invention are set forth in the following description and drawings wherein like reference numbers depict like elements.

In accordance with the present invention, a method of storing an active film comprises providing at least one strip of an active film material, with the strip having two major surfaces, and a carrier film, positioning the at least one active film material strip with respect to the carrier film, and rolling the at least one strip and the carrier film together such that the at least one strip of active film material is isolated along its two major surfaces from the environment while the carrier film and the at least one strip are in a rolled condition.

Still further, in accordance with the present invention, a roll of film comprises a carrier film, and at least one strip of an active film material with each strip having two major surfaces, isolated along its two major surfaces from the environment. In one embodiment, the at least one strip of active film material is interleaved between layers of the carrier film. In a second embodiment, the at least one strip is incorporated into the carrier film.

The term "active film" as used herein means a film or film strip which contains, as a component, constituent, additive, or coating, a gas scavenger such as an oxygen scavenger, an oxygen indicator, an anti-microbial agent, a fungicide, or an additive or coating having some other desired functionality.

The term "carrier film" as used herein means a material intended for a packaging application, which also serves, in the rolled condition, to isolate the active film from the environment.

DESCRIPTION OF THE PREFERRED EMBODIMENTS

Figure 1:
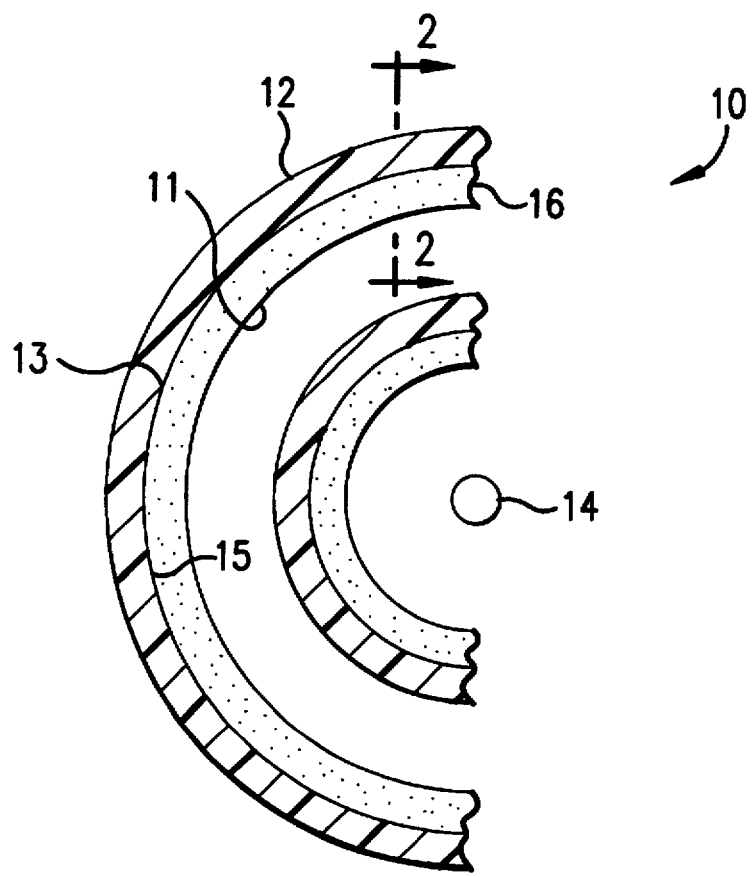
FIG. 1 shows a portion of a roll of film, in schematic fashion, according to the present invention.

Referring to FIG. 1, a schematic portion of a roll of film 10 in accordance with the present invention is shown. As shown therein, a carrier film 12 is rolled in a conventional manner around a core 14. For the sake of clarity, a portion of only two "winds" of the roll of film is shown in FIG. 1. The carrier film may be a single layer material or a material having a plurality of layers. When formed from a plurality of layers, the carrier film may be such that the layers are coextruded, extrusion coated, or laminated.

In one embodiment of the present invention, a finite strip 16 of an active material is bonded to, or otherwise placed adjacent to, a surface 15 of the carrier film 12. Due to this positioning of the finite strip 16 with respect to the carrier film 12, the finite strip 16 of an active film material can be rolled around the core 14 along with the carrier film 12, such that the finite strip 16 is interleafed with the carrier film 12. Because the carrier film 12 will form the outside of the roll, and the active film strip 16 will always be inside the carrier film 12, the active film material forming the strip 16 will not be exposed to the outside environment or atmosphere at least with respect to the two major surfaces 11 and 13 of the strip 16. In this way, the functionality of the active film material can be substantially preserved.

Figure 2:
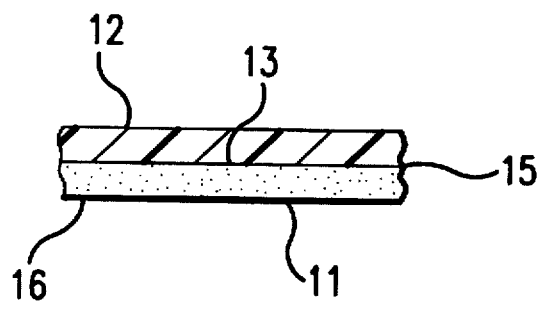
FIG. 2 shows a cross-section of the film roll of FIG. 1, taken along line 2—2 of FIG. 1.
Figure 3:
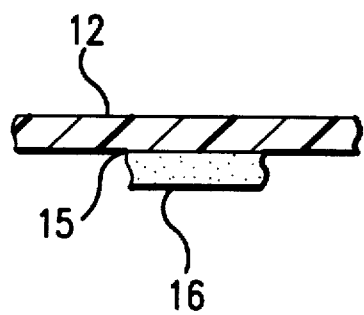
FIG. 3 shows an alternative embodiment in cross-section of the film roll of FIG. 1.

FIG. 2 illustrates a cross-section of the finite strip 16 and carrier film 12 taken along line 2—2 of FIG. 1. In this particular embodiment, the finite strip 16 is shown as being as wide as the carrier film 12. There will therefore be some limited exposure of finite strip 16 to the environment along the edges of the strip, but no exposure along the two major surfaces 11 and 13 (i.e. the two widest surfaces) of finite strip 16. In FIG. 3, the finite strip 16 is shown as being narrower in width than carrier film 12, so that when the strip/film combination is rolled up around core 14, the two major surfaces as well as the lateral edges of finite strip 16 are protected from exposure to the environment.

Figure 4:
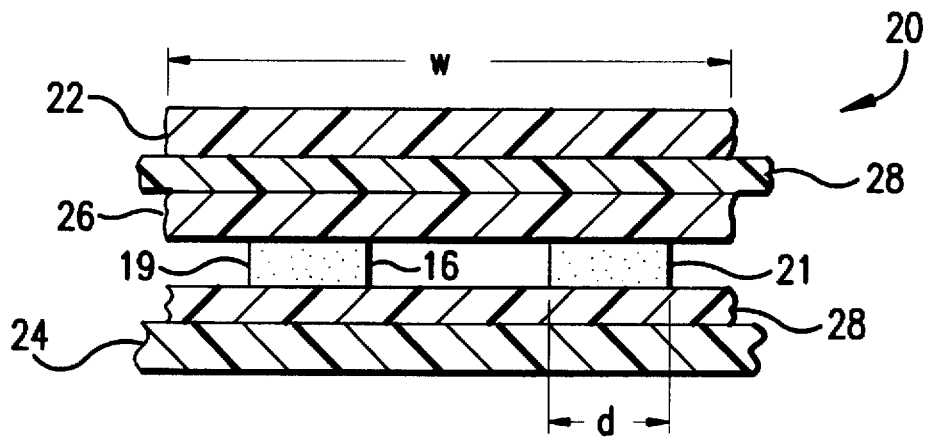
FIG. 4 shows a cross-section of a multilayer film in accordance with the invention.

FIG. 4 illustrates an alternative approach for isolating the active material from the environment. In this embodiment, one or more finite strips 16 of active film material are incorporated as a layer into a multilayer carrier film structure 20 having a skin layer 22, a sealant layer 24, an oxygen barrier layer 26, and one or more tie layers 28. As shown therein, the lateral extent "d" of each of the two finite strips 16 of active film material is less than the distance "w" between the lateral edges 19 and 21 of the film. Thus, the active film material is totally surrounded by the carrier film and its functionality is preserved.

Although in FIG. 4 an active film strip 16 is shown as a part of a coextruded film structure, the film strip 16 can also be layered as a discrete film or film strip laminated to one or more of the layers of the carrier film 12.

Figure 5:
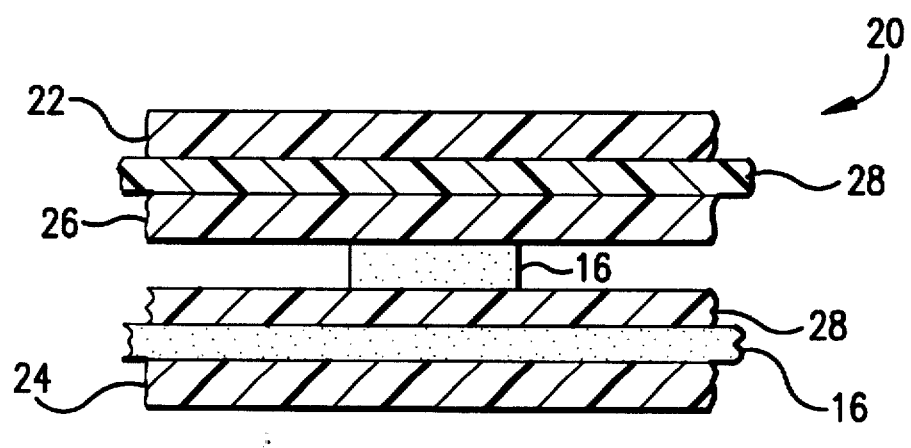
FIG. 5 shows a cross-section of an alternative embodiment of a multilayer film in accordance with the invention.

A single active film strip 16 can be utilized in connection with the present invention, and located as a discontinuous layer in a multilayer film as shown in FIG. 4. Also, more than two film strips 16 can be used in such a film, or else one or more finite strips 16 can be included in more than one layer of a multilayer film, so that multiple strips 16 can be located at different locations in the film construction. This is shown in FIG. 5.

Carrier film 12 and the active film strip 16 can be made at least partly or wholly from any of the thermoplastic materials typically used for packaging applications. These include such materials as olefin polymers and copolymers, polyamides, polyesters, polypropylenes, and ethylene polymers and copolymers thereof. In particular, the oxygen barrier layer 26 is preferably an ethylene vinyl alcohol copolymer, a vinylidene chloride/methyl acrylate or vinyl chloride copolymer, polyamide, or copolyamide, polyester, or other suitable oxygen barrier material. The tie layers 28 are preferably an olefinic polymer or copolymer, and more preferably a modified olefinic polymer or copolymer such as anhydride graft copolymers.

The active or functional agent or material in the active film 16 can be an oxygen scavenger of the type discussed above, an anti-microbial agent, a fungicide, or any other additive or active agent which benefits from isolation from the environment or atmosphere, prior to actual use in a package, in order to protect or preserve some or all of its functionality or activity.

One of the advantages attendant to the present invention is that the functionality or activity of the active film material can be preserved in a unique and cost-effective way without interfering with other functions such as clarity and sealing.

Those skilled in the art will also appreciate that modifications to this invention can be made, after review of the present specification, without departing from the spirit and scope of the invention as defined below.

For example, although the invention described and illustrated for example by reference to FIG. 4 shows discontinuous finite strips 16 with respect to the transverse direction (i.e. across the width of) a multilayer film, the finite strips 16 can instead, or also, be discontinuous with respect to the machine direction of the film, i.e. along the length of the film. In this alternative embodiment, "w" indicated in FIG. 4 can represent a length of the film, and "d" represents discontinuous segments of the film, along its length, within which finite strips 16 are positioned.

Thus, the film strips 16 may be discontinuous either in the transverse direction (i.e. across the width of the film) or in the machine direction (i.e. along the length of the film), or both.

What is claimed is:

1. A method for storing a film having an active film material which comprises the steps of:

providing at least one strip of oxygen scavenging material with each said strip having two major surfaces and a lateral width;

providing a carrier film with a lateral width greater than the lateral width of the at least one strip of oxygen scavenging material;

positioning said at least one strip of oxygen scavenging material with respect to said carrier film; and rolling said carrier film and said at least one strip of oxygen scavenging material so that said at least one strip is isolated along its two major surfaces from the environment while said carrier film and said at least one strip are in a rolled condition.

2. The method of claim 1 wherein said positioning step comprises placing said at least one strip of oxygen scavenging material adjacent a surface of said carrier material.

3. The method of claim 1 wherein said positioning step comprises incorporating said at least one strip of oxygen scavenging material into said carrier film.

4. The method of claim 1 wherein said carrier film has a multilayer construction and said positioning step comprises incorporating said at least one strip of oxygen scavenging material into said multilayer construction so that a lateral extent of said at least one strip is less than a distance between terminal sides of the carrier film.

5. The method of claim 4 wherein said incorporating step comprises incorporating two strips of oxygen scavenging film material into said multilayer construction with each strip having a lateral extent less than the distance between the terminal sides of the carrier film.

* * * * *